(Model.)

R. LINKE.
STOP VALVE.

No. 245,731. Patented Aug. 16, 1881.

Witnesses:
A. P. Grant,
H. F. Kircher

Inventor.
Robert Linke,
By John A. Gudershaw
atty.

UNITED STATES PATENT OFFICE.

ROBERT LINKE, OF NEUSALZ-ON-THE-ODER, PRUSSIA, GERMANY.

STOP-VALVE.

SPECIFICATION forming part of Letters Patent No. 245,731, dated August 16, 1881.

Application filed May 11, 1881. (Model.) Patented in Germany October 19, 1879.

*To all whom it may concern:*

Be it known that I, ROBERT LINKE, a subject of the Empire of Germany, residing at Neusalz-on-the-Oder, in the Province of Silesia, Prussia, Germany, have invented a new and useful Improvement in Stop-Valves, which improvement is fully set forth in the following specification and accompanying drawings, in which—

Figure 1:
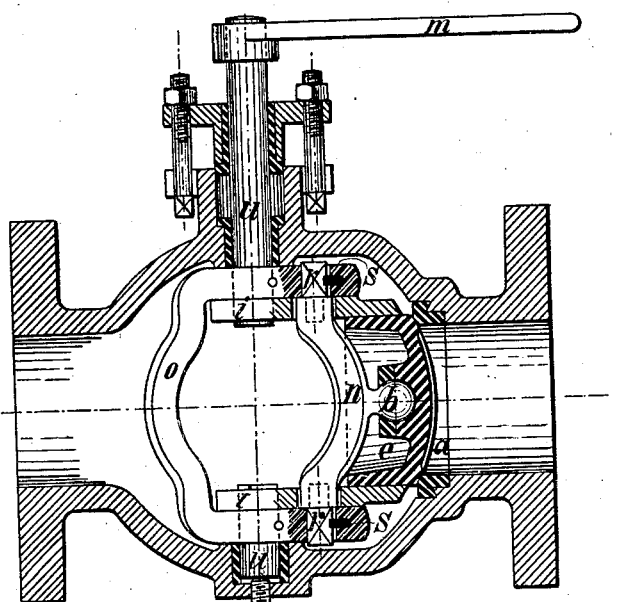
Figure 2:
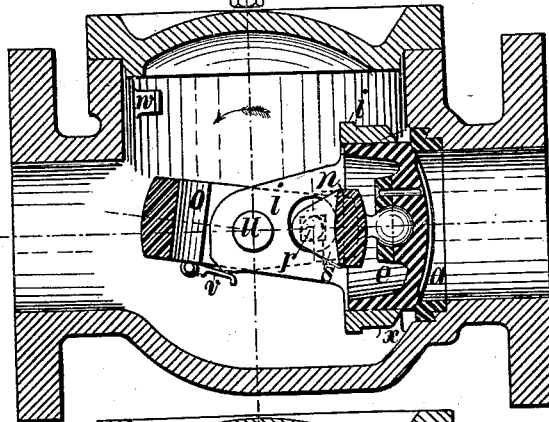
Figure 3:
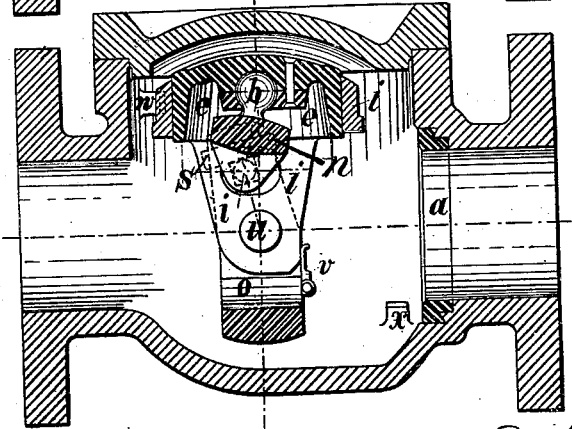

Figure 1 is a longitudinal section of the entire stop-valve. Fig. 2 is a longitudinal section appearing in a plane vertical to that of Fig. 1. Fig. 3 is a section similar to Fig. 2, but showing the valve in a fully opened position.

Similar letters of reference indicate corresponding parts in the several figures.

My invention relates to improvements in stop-valves; and the objects of my improvements are to avoid every narrowing of the cross-section when the valve is fully opened; for the purpose of avoiding every loss of pressure, and to render it possible to open the valve as rapidly as an ordinary stop-cock, and to open and shut the valve very easily, even if of the largest dimensions, and to unite the advantages of stop-valves and slide-valves. I attain these objects by the mechanism and construction of the valve, as hereinafter set forth.

Referring to the drawings, A represents the box of the valve $e$, and $a$ its seat. The reciprocal surfaces both of the seat $a$ and the valve $e$ are of the same spherical shape, the center of which is located at a point where the geometrical axis of the shaft $u$ $u$ is crossed by the geometrical axis of the valve $e$ and its seat $a$; but nevertheless those surfaces may be situated in a plane vertical to the axis of the valve and the seat. The valve $e$ slides in the cylindrical guide-piece $i$, which is suspended and fixed to the shaft $u$ $u$.

The shaft $u$ $u$ consists of two cylindrical parts, the one part serving as a pivot, and the other part passing through the stuffing-box, and has at its outer extremity the hand lever or key $m$, both parts being connected together by the link-piece $o$, which is so shaped that by turning it to about a right angle, as shown by Fig. 3, it fully escapes the cross-section of the valve. The valve $e$ is connected with another link-piece, $n$, by means of a ball-joint, $b$, and this link-piece $n$ turns freely around the pivots $r$ $r$, connected with the forks of the link $o$.

The pivots are provided with squared heads, placed within corresponding slots of the link-piece $o$ by means of the small wedges $s$ $s$, and made adjustable by laying thin metal plates behind the squared heads of the pivots $r$, opposite to the side of the wedges $s$ $s$. In this manner the length of the forks of the link $o$ may be sufficiently increased, if, in consequence of a fracture of the valve or its seat, the surfaces of both must be repaired by grinding. Both links $o$ and $n$ are formed in such manner that there exists between them a space as large as the cross-section of the valve.

Two small springs, $v$ $v$, are fixed to the link-piece $o$, which press upon the arms of the guide-piece $i$. In the closed position the guide-piece $i$ rests upon the tappets $x$ $x$, and in opened position it inclines toward the tappets $w$ $w$, arranged on the partition of the valve-box.

To open the valve the hand-lever is turned in the direction of the arrow in Fig. 2, the result being the open valve, as shown in Fig. 3. The valve is thus lifted from its seat by means of the links $n$ and $o$, and turned out of the way by the forward turning of the key $m$ at about a right angle.

If the valve is to be shut, the hand-lever is turned in the opposite direction, so that the guide-piece $i$ leans on the tappets $x$ $x$, in which position its geometrical axis coincides with that of the seat $a$. During this manipulation the guide-piece is carried along assisted by the springs $v$ $v$. The guide-piece now being in the aforesaid position, the key $m$ is again slightly turned, and a horizontal motion of the valve, caused by the motion of the links $n$ and $o$, produces a completely tight locking up.

It will also be noticed that the valve may be partly opened, like an ordinary stop-cock, the key $m$ made adjustable with regard to its different positions, the box constructed as a knee or elbow, and the valve used as a distributing-valve.

Having thus described my invention, what I claim as new, and desire to secure by Letters Patent of the United States, is—

1. In a stop-valve, the valve $e$, guide-piece $i$, ball-joint $b$, link $o$, and operating-shaft $u$, combined and operating substantially as and for the purpose set forth.

2. In a stop-valve, the combination of the forked links $o$ and $n$, the pivots $r$, and the crank-shaft $u$, substantially as shown, and for the purpose set forth.

3. In a stop-valve, the combination, with the valve $e$, of the link $n$, link $o$, guide-piece $i$, and the springs $v$, substantially as and for the purpose set forth.

ROBERT LINKE.

Witnesses:
 FRANZ A. SEMTNER.
 A. BRODTMANN.